(12) United States Patent
Alawieh et al.

(10) Patent No.: US 12,536,355 B2
(45) Date of Patent: Jan. 27, 2026

(54) USING SURROGATE NETLISTS FOR VARIATION ANALYSIS OF PROCESS VARIATIONS

(71) Applicant: Synopsys, Inc., Mountain View, CA (US)

(72) Inventors: Mohamed Baker Alawieh, Austin, TX (US); Han-Sen Dai, Fremont, CA (US); Todd Gordon McKenzie, Austin, TX (US); Kishore Singhal, Milpitas, CA (US)

(73) Assignee: Synopsys, Inc., Sunnyvale, CA (US)

( * ) Notice: Subject to any disclaimer, the term of this patent is extended or adjusted under 35 U.S.C. 154(b) by 604 days.

(21) Appl. No.: 18/152,069

(22) Filed: Jan. 9, 2023

(65) Prior Publication Data
US 2024/0232486 A1 Jul. 11, 2024

(51) Int. Cl.
*G06F 30/3308* (2020.01)
*G06F 30/20* (2020.01)
(Continued)

(52) U.S. Cl.
CPC ........ *G06F 30/3308* (2020.01); *G06F 30/327* (2020.01); *G06F 30/20* (2020.01); *G06F 30/367* (2020.01); *G06F 30/398* (2020.01)

(58) Field of Classification Search
CPC .. G06F 30/3308; G06F 30/327; G06F 30/367; G06F 30/398; G06F 30/20
(Continued)

(56) References Cited

U.S. PATENT DOCUMENTS

| 6,532,574 B1 * | 3/2003 | Durham | G06F 30/327 |
| | | | 716/113 |
| 7,260,799 B2 * | 8/2007 | Baumgartner | G06F 30/3323 |
| | | | 703/15 |

(Continued)

FOREIGN PATENT DOCUMENTS

| CN | 113536718 B | * | 12/2021 | ............. G06F 30/34 |
| KR | 102350941 B1 | * | 1/2022 | ......... G06F 30/3308 |
| KR | 102400557 B1 | * | 5/2022 | ......... G06F 30/3312 |

OTHER PUBLICATIONS

Nguyen et al., "Comparative Study of Surrogate Modeling Methods for Signal Integrity and Microwave Circuit Applications", IEEE Transactions on Components, Packaging and Manufacturing Technology, vol. 11, No. 9, Sep. 2021, pp. 1369-1379. (Year: 2021).*

(Continued)

*Primary Examiner* — Phallaka Kik
(74) *Attorney, Agent, or Firm* — Fenwick & West LLP

(57) ABSTRACT

In some aspects, surrogate netlists are used instead of the actual netlist of interest (the target netlist) in order to speed up the runtime for variation analysis. It is desired to characterize the distribution of a circuit's response as a function of process variation, in a tail region of the distribution. The tail region of the distribution is located by performing a variation analysis based on samples generated by circuit simulations of one or more transistor-level surrogate netlists. The circuit simulations of the surrogate netlists have shorter runtimes than circuit simulations of the target netlist, resulting in a decrease of the overall runtime. The distribution in the tail region is then characterized based on samples generated by circuit simulations of the actual target netlist.

20 Claims, 6 Drawing Sheets

(51) Int. Cl.
*G06F 30/327* (2020.01)
*G06F 30/367* (2020.01)
*G06F 30/398* (2020.01)

(58) Field of Classification Search
USPC ............ 716/106, 111, 104, 136; 703/15
See application file for complete search history.

(56) References Cited

U.S. PATENT DOCUMENTS

| | | | | |
|---|---|---|---|---|
| 7,735,052 | B2 * | 6/2010 | Shi | G03F 7/70125 |
| | | | | 716/53 |
| 7,885,799 | B2 * | 2/2011 | Huang | G06F 30/367 |
| | | | | 703/13 |
| 8,380,435 | B2 * | 2/2013 | Kumaran | G01V 1/301 |
| | | | | 700/89 |
| 8,533,637 | B2 * | 9/2013 | Reid | G06F 30/398 |
| | | | | 716/54 |
| 9,183,332 | B2 * | 11/2015 | Ferguson | G06F 30/367 |
| 10,896,274 | B1 * | 1/2021 | Morency | G06F 30/3308 |
| 2006/0190873 | A1 * | 8/2006 | Baumgartner | G06F 30/3323 |
| | | | | 716/107 |
| 2012/0266123 | A1 * | 10/2012 | Jain | G06F 30/20 |
| | | | | 716/112 |
| 2014/0325460 | A1 * | 10/2014 | Ferguson | G06F 30/367 |
| | | | | 716/103 |
| 2018/0033597 | A1 * | 2/2018 | Laskin | H01J 49/0004 |
| 2022/0261654 | A1 * | 8/2022 | Wu | G06F 30/27 |
| 2023/0096934 | A1 * | 3/2023 | You | G06F 30/398 |
| | | | | 716/103 |

OTHER PUBLICATIONS

Chen et al., Taiwan Patent Document No. CN-113536718-B, published Aug. 11, 2022, 2 pages including abstract and claims. (Year: 2022).*

* cited by examiner

USING SURROGATE NETLISTS FOR VARIATION ANALYSIS OF PROCESS VARIATIONS

TECHNICAL FIELD

The present disclosure relates to estimating the effect of process variations on the operation of integrated circuits.

BACKGROUND

The complexity of advanced technology nodes for the fabrication of integrated circuits has exacerbated the effect of process variations introduced throughout the manufacturing process. These variations result in random deviation from the intended behavior of the circuit design. At the same time, many designs are optimized with respect to performance, power, and area but with small design margins. This results in higher sensitivity to process variation. These factors, combined with trends such as the push for ultra-low voltage designs and the high reliability requirements in sectors such as aerospace, military and automotive, increase the impact of process variation on circuit performance and manufacturing yield.

Variation analysis is one technique used to help users understand the impact of process variation. The goal of variation analysis is to characterize the distribution of a circuit's response considering process variation. This is done by simulating the circuit's operation under different process variations, thus generating samples of the circuit's response as a function of process variation. However, the number of simulations required can be large and take a long time.

SUMMARY

In some respects, surrogate netlists are used instead of the actual netlist of interest (the target netlist) to speed up the runtime for variation analysis. It is desired to characterize the distribution of a circuit's response as a function of process variation, in a tail region of the distribution such as the 3σ tail region of the distribution. The tail region of the distribution is located by performing a variation analysis based on samples generated by circuit simulations of one or more transistor-level surrogate netlists. The circuit simulations of the surrogate netlists have shorter runtimes than circuit simulations of the target netlist, reducing the overall runtime. The distribution in the tail region is then characterized based on samples generated by circuit simulations of the actual target netlist.

Other aspects include components, devices, systems, improvements, methods, processes, applications, computer readable mediums, and other technologies related to any of the above.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1:
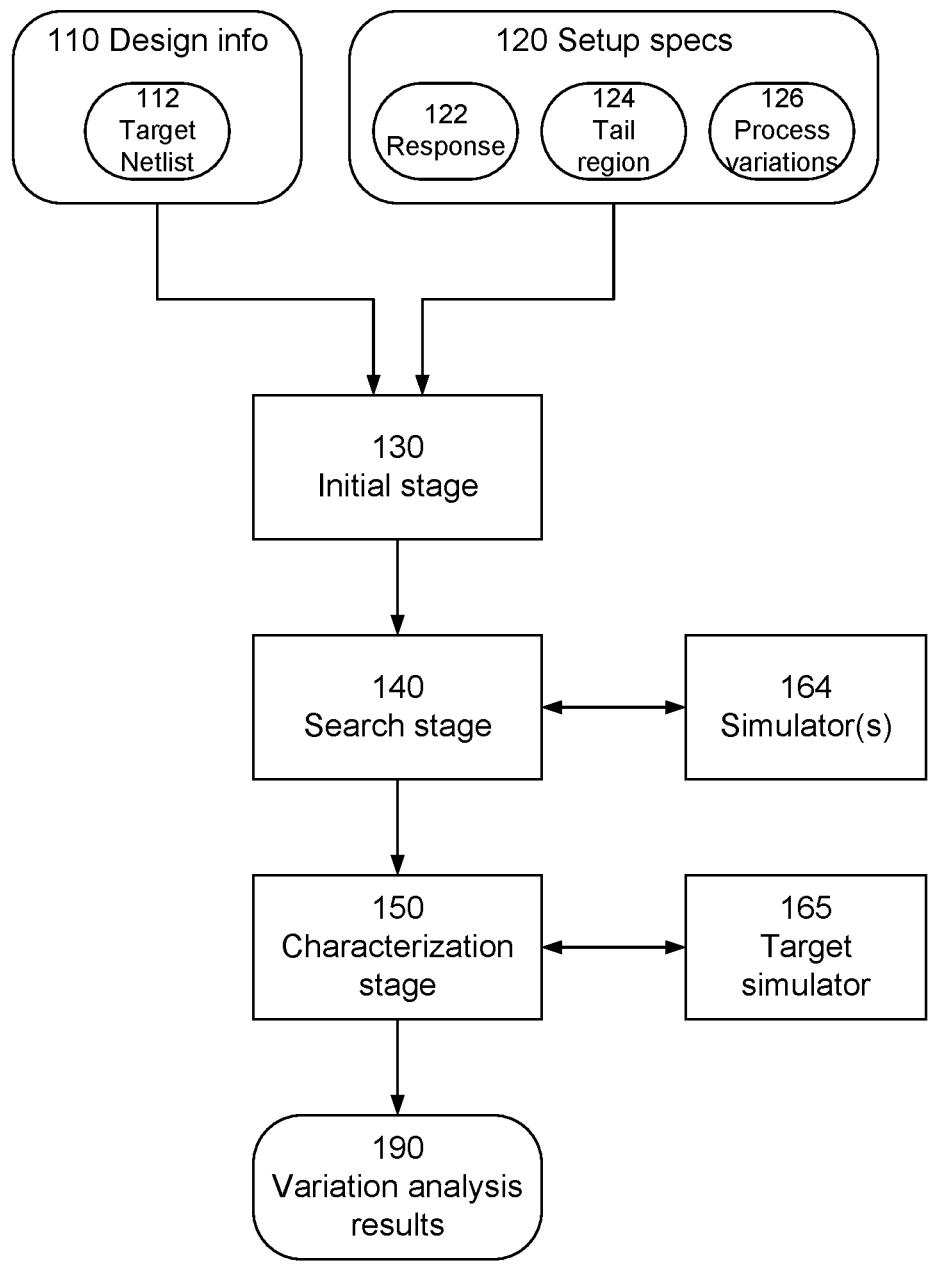
FIG. 1 is a flowchart of a variation analysis using surrogate netlists according to some embodiments of the present disclosure.

Aspects of the present disclosure relate to using surrogate netlists for variation analysis of process variations. Variation analysis is used to characterize the response of a given circuit design considering process variation. The goal is to estimate the probability distribution of the circuit's response as a function of the process variation. This can then be used for yield analysis, design optimization, logic synthesis, and other purposes.

One application is the characterization of standard cells. Standard cells are the fundamental building blocks for integrated circuit design and can have a very high replication rate. Millions of instances of a given cell may appear in a single design. With this high replication rate, the responses of the cell instances can vary significantly. Hence, characterizing the response at the tail regions of the probability distribution is useful to build robust designs. These tail regions may be the 3σ (99.86 percentile) or more extreme regions of the distribution.

One approach to characterizing the response in these tail regions is based on running a large number of Monte Carlo simulations—enough to cover the desired tail region at a given standard deviation (sigma) requirement. Running such simulations for many cells or for large designs, under high sigma requirements, can take a long time. Therefore, variation analysis tools may use different methods to reduce this runtime cost. For example, selective sampling, machine-learning based approaches, and statistical analysis may be used to reduce the number of samples required to characterize the response distribution in the tail region.

In the variation analysis described in this disclosure, a multi-stage approach is used. In a search stage, the design is simulated to obtain samples of the response which can be used to build internal machine learning models, perform statistical analysis, or whatever is used by the variation analysis to identify the tail region. This search stage may involve iterative processes that are repeated multiple times before reaching the tail region of the distribution. To shorten the overall runtime, surrogate netlists which run faster than the target netlist are used during this search stage. In a later characterization stage, the response distribution in the tail region may be characterized by running simulations of the target netlist in the tail region.

The number of simulations run in the search stage is typically much larger than the number of simulations in the characterization stage. In the search stage, a significant number of simulations may be needed for the variation analysis. There may be many iterations and a large number of simulations per iteration. However, these simulations are not used to characterize the response of the circuit. Rather, they are used to guide the search process to identify the location of the tail region of interest. As a result, they can be less accurate, particularly if accuracy is traded off for runtime speed.

As described herein, netlists other than the actual netlist of interest may be used. These are referred to as surrogate netlists, while the netlist of interest is referred to as the target netlist. The simulations of the surrogate netlists have shorter runtimes than the target netlist, but their responses are sufficiently correlated with the target netlist responses so that the accuracy is sufficient for the variation analysis to reach the tail region of the distribution. In the characterization stage, higher accuracy, longer runtime simulations of the target netlist are run to characterize the response distribution for the target netlist in the tail region.

Technical advantages of the present disclosure include, but are not limited to, the following. The faster runtime of the surrogate netlists reduces the overall runtime, while still achieving the desired tasks. In addition, to the extent that the surrogate netlists or their simulation is simpler, this may reduce the compute resources required. Less memory, lower processing capability and less communications bandwidth may be required.

In more detail, FIG. 1 is a flowchart of a variation analysis using surrogate netlists according to some embodiments of the present disclosure. The target circuit of interest is described by design information 110, which includes a transistor-level netlist 112 of the circuit. The design information may also include models of the circuit and technology node model files. The target circuit may be a standard cell. Other examples of target circuits include SRAM (memory) cells or blocks, and analog and mixed signal blocks. The netlist may contain thousands or tens of thousands of transistors, or more.

In this example, the setup specifications 120 identify the response of interest 122, the tail region of interest 124, and the process variations of interest 126. Examples of response 122 include the propagation delay through the circuit, the slew of the circuit output or other signal of interest, hold and/or setup times, and duty cycle. Examples of process variations 126 include variations in oxide thickness, random dopant fluctuation, and line edge roughness. The tail region 124 may be identified by standard deviations, such as the $4\sigma$ or $5\sigma$ or $6\sigma$ tail region, or by percentiles, such as the 99.5, 99.9 or 99.99 percentiles. For non-normal distributions, the $\sigma$-based descriptions may be referenced to percentiles of the normal distribution. For example, the $3\sigma$ tail region refers to the 99.86 percentile of the distribution. The following examples use a tail region, but the principles described may also be applied to specifications that identify other regions of the distribution.

The setup specifications 120 may be provided as user input, for example by a user-provided file or through a user interface. They may also be provided by other processes or machines. If the variation analysis is used to guide logic synthesis, analyze yield or for other design optimization, some or all of these setup specifications 120 may be provided by the logic synthesis tool, the yield analysis tool, or some other circuit design tool.

The flow of FIG. 1 has three stages, which may be executed by a software tool(s). In the initial stage 130, the software tool parses the input data and initializes the main flow. In the search stage 140, the tool identifies the tail region using simulations of surrogate netlists. In the characterization stage 150, the tool generates final variation analysis results 190 for the target netlist. This characterizes the response distribution of the target netlist in the tail region, based on simulations of the target netlist.

FIG. 1 also shows simulator(s) 164, 165, which are used to perform the circuit simulations of the netlists. The simulator 165 used to characterize the target netlist is referred to as the target simulator. It will have the accuracy required for the characterization stage 150. The simulator(s) 164 used to simulate the surrogate netlists during the search stage 140 may include the target simulator, but may also include other faster running simulators. Examples of circuit simulators include SPICE and FastSPICE simulators.

Figure 2:
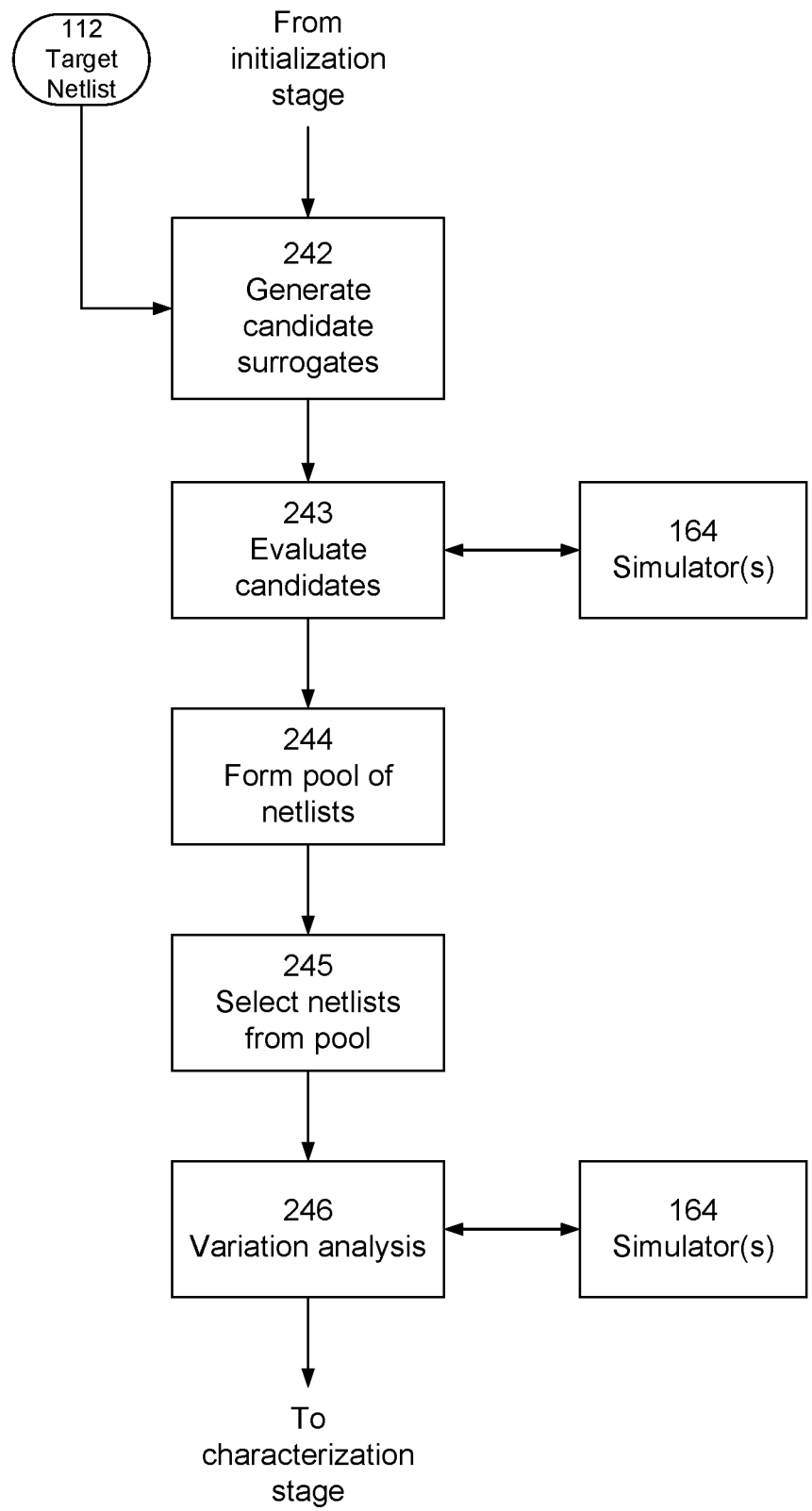
FIG. 2 is a flowchart of a search stage of variation analysis according to some embodiments of the present disclosure.

FIG. 2 shows an example implementation of the search stage 140. At 242, the software tool generates many candidate surrogate netlists. It evaluates the different candidate netlists at 243, and creates a pool of surrogate netlists from the qualified candidates at 244. The tool selects surrogate netlists from the pool at 245, and performs the variation analysis to identify the tail region using these surrogates at 246.

At 242, the goal of the tool is to generate surrogate netlists that approximate the behavior of the target netlist but with shorter simulation time. This can be achieved by various methods. Usually, the surrogate netlist will perform the same logic function as the target netlist, but other differences will result in faster simulation of the surrogate.

Circuit reduction techniques, including logic reduction, may be applied to the target netlist to generate candidate surrogate netlists. Logic reduction leads to fewer transistors and parasitic elements in the surrogate version of the netlist. Other reduction techniques include RC reduction, shorting small resistors (i.e., replacing a small resistor with a conductor without the resistor), and removing small capacitors.

Faster runtimes may also be achieved by using different simulators. For example, if the target simulator is a SPICE simulator, then FastSPICE simulators may be used for the search stage 140. Another option is to use the same simulator but with settings that can be simulated faster. A SPICE simulator set to a less accurate but faster running setting may be used for the characterization stage 150, but then used on a more accurate setting for the search stage 140.

At 243 and 244, the tool evaluates and selects a pool of surrogate netlists from the candidates generated at 242. The selection 244 may be based on a combination of (i) runtime speedup and (ii) correlation with the target netlist. Candidate netlists are "better" if they achieve more speedup while maintaining higher correlation. Surrogates generated from the same approach (e.g., logic reduction) can perform differently for different target netlists. Therefore, the candidate netlists are evaluated 243 based in part on simulation results from the target netlist.

These evaluations 243 are based on simulations of the candidate netlists using whatever simulator 164 is proposed for the candidates. The resulting runtimes and responses are compared to those of the target netlist using the target simulator. This is done for a limited number of samples sufficient to determine the speedup and correlation for the candidates. If the samples are chosen randomly for each simulation then the samples may be different for different netlists. The results for different netlists are mapped to each other to facilitate comparison.

For example, some surrogate netlists may have a different number of transistors than the target netlist. Some transistors may be removed and others may be merged. Process variation may be defined at the transistor level, where a set number of process variables is used for each transistor. The number depends on the foundry model files. If the target netlist has 100 transistors with 10 variables per transistor, then sample points for the target netlist are defined by 1000 variables. If a surrogate netlist has a different number of transistors, then sample points for the surrogate netlist are defined by a different number of variables. The variables for the surrogate netlist are mapped to the 1000 variable for the target netlist, or vice versa, in order to compare simulations of the surrogate and target netlists. The mapping depends on how the surrogate netlist was generated from the target netlist.

In one approach, the netlists are simulated at the same amount of process variability, even though the individual variables may be different for different netlists. In other words, sample #1 reflects the same variability profile in all netlists but has different individual process variation values depending on the individual netlist. When a new surrogate netlist is formed, the sample mapping to the target netlist is done as well.

Figure 3:
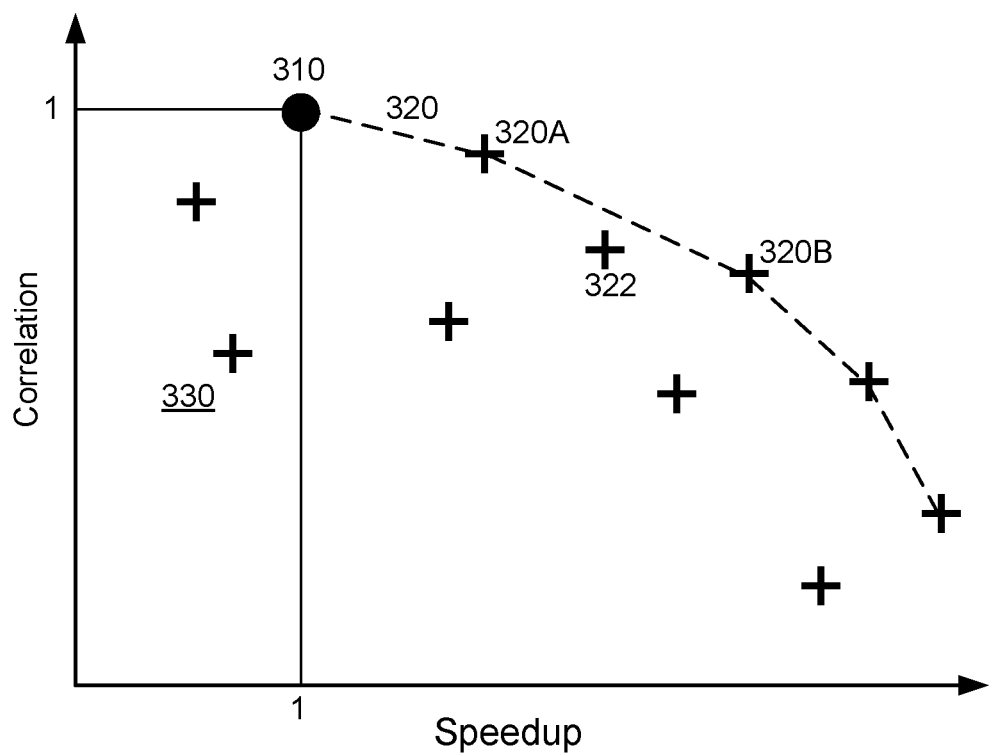
FIG. 3 illustrates a Pareto front according to some embodiments of the present disclosure.

After running the simulations, the candidate netlists with good speedup and correlation are selected at 244 to form a pool of surrogates for the variation analysis 246. Since there is a trade-off between speedup and correlation, selection may be based on Pareto optimality. A Pareto-optimal situation is one where no change could lead to improvement in one of the metrics without a degradation of the other. FIG. 3 illustrates this concept.

FIG. 3 is a scatterplot of different netlists as a function of speedup and correlation. The target netlist is shown as a dot 310 with speedup=1 and correlation=1. The candidate netlists are shown as +'s. The dashed lines 320 is the Pareto front, and the netlists along this front are the Pareto-optimal candidates where, for the same value of one metric, none of the other netlists can provide improvement on the other metric. In other words, no netlist can achieve the same speedup with higher correlation, or the same correlation with more speedup. Note that the target netlist is part of the Pareto front and may be included in the pool for the variation analysis 246.

All netlists that fall within region 330 have speedup<1. These are sub-optimal since they provide no speedup (speedup<1) compared to the target netlist. For the other netlists (speedup>1 but not on the Pareto front 320), there exists a corresponding netlist on the Pareto front that provides a better tradeoff of speedup versus correlation.

Based on this evaluation, the pool may be formed by the netlists on the Pareto front 320. Other netlists may also be included in the pool. For example, netlist 322 may be included because it is close to the Pareto front 320 and there is a long span along the Pareto front between the adjacent Pareto-optimal candidates 320A,B. Alternatively, the pool may be formed by netlists that fall within a band around the Pareto front.

In FIG. 2, the variation analysis that identifies the tail region is performed at 246 using surrogate netlist(s) from the pool. The variation analysis may rely on learning-based methods and statistical analysis to generate interim models that help with sample selection and performance optimization. These machine learning methods may be employed to reduce the required number of simulations by leveraging model predictions and statistical analysis.

The variation analysis flow within the tool typically includes iterative processes with refinement steps that target the tails of the distribution. In these steps, a significant number of simulations are run for the internal tool analysis. These simulations are not used to characterize the response but to guide the search process towards the tail region of interest in which the response characterization can be performed. Instead of running computationally expensive but accurate simulations for this analysis, the surrogate netlists are used to generate faster simulation results that still achieve the desired task.

Since these simulations are intended to guide the tool to the region of interest, their accuracy requirement can be relaxed. In practice, marginal accuracy loss can be tolerated to reduce the computational cost of these simulations.

As a result, the variation analysis 246 during the search stage uses one or more surrogate netlist(s) based on the internal algorithms it uses. For example, different surrogates can be used in different iterations of the process to produce different samples. The variation analysis engine may select the set of samples to simulate at each point in time, and also select the netlist(s) used to simulate the samples. The netlist may be selected in order to optimize the objective of the engine for the task it is trying to achieve. The engine may also aggregate results from different netlists in a single analysis framework.

Figure 4C:
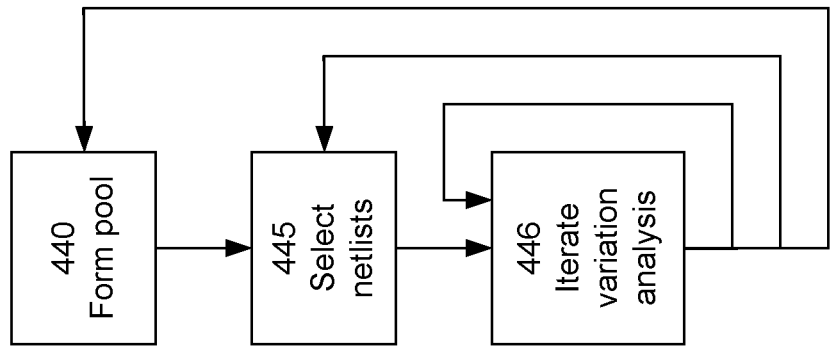
FIGS. 4A-4C are additional flowcharts of search stages according to some embodiments of the present disclosure.
Figure 4B:
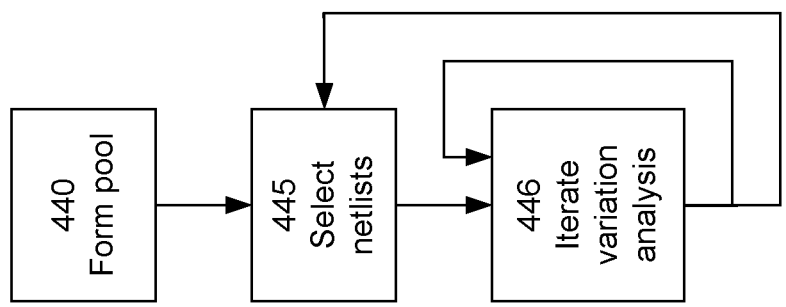
Figure 4A:
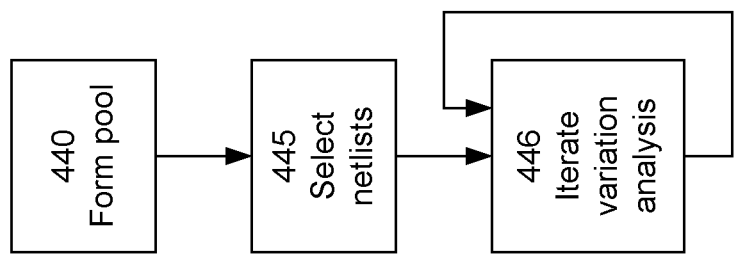

FIGS. 4A-4C show some variations on selection of the surrogate netlists for the variation analysis. In this example, the variation analysis includes many iterations 446. "Form pool" 440 may include all of the steps 242-244 of FIG. 2. It represents the population of a pool of surrogate netlists. Step 445 is then the selection of surrogate netlists from this pool for one or more iterations of the variation analysis 446. In FIG. 4A, the pool is formed 440 once and surrogate netlists are selected 445 once. This choice of surrogate netlists is used for all iterations 446 of the variation analysis. In this case, the pool formation 440 and surrogate netlist selection 445 may be collapsed into a single process.

In FIG. 4B, the pool is formed 440 once, but the different surrogate netlists may be programmatically selected 445 for different iterations 446 of the variation analysis. In some iterations, accuracy may be more important than runtime, so surrogate netlists with higher accuracy may be selected, or vice versa. As another example, some surrogate netlists may be better for certain process corners (fast corners versus slow corners), and the netlists may be selected on this basis. For a particular circuit design, variation analysis may be performed for different input/output pins (arcs) and under different states (conditions) of the other pins in the circuit. Arcs of interest may include critical timing paths. Different surrogates may be selected for different arcs and conditions. Different surrogates may also be selected for different supply voltages (low voltage vs high voltage). In addition, these considerations may change over time as the search stage progresses. The surrogate netlists in the pool may also be reevaluated from time to time as the search stage progresses.

In FIG. 4C, the pool is also re-formed 440 from time to time. As the search stage progresses towards the tail region, the performance of the different netlists may change. Netlists that were not good candidates at the beginning of the search stage may become better candidates later in the stage, and vice versa. The netlists that form the Pareto front may change. In FIG. 4C, the pool is programmatically updated from time to time to account for these changes over time.

Returning to FIG. 1, since the responses predicted in the search stage may largely be based on surrogate netlists rather than the target netlist, the characterization stage 150 uses a small number of simulations from the target netlist and the target simulator around the tail region of interest to generate the final results 190. The responses from surrogate netlists may also be used for characterization by mapping their responses to corresponding responses of the target netlist.

The variation technology described in this disclosure provides significant performance improvement, especially when characterizing large designs with high standard deviation requirement where the simulation runtime is long. In such cases, faster simulations of surrogate netlists can significantly cut down on runtime. In experiments to date, the surrogate netlists generated can achieve over 5× reduction in the simulation runtime while maintaining high correlation with the results in the target netlist. When integrated in the variation analysis tool flow, the use of surrogate netlists can achieve a 3× or better overall runtime reduction with virtually zero loss in the accuracy of the final results.

Figure 5:
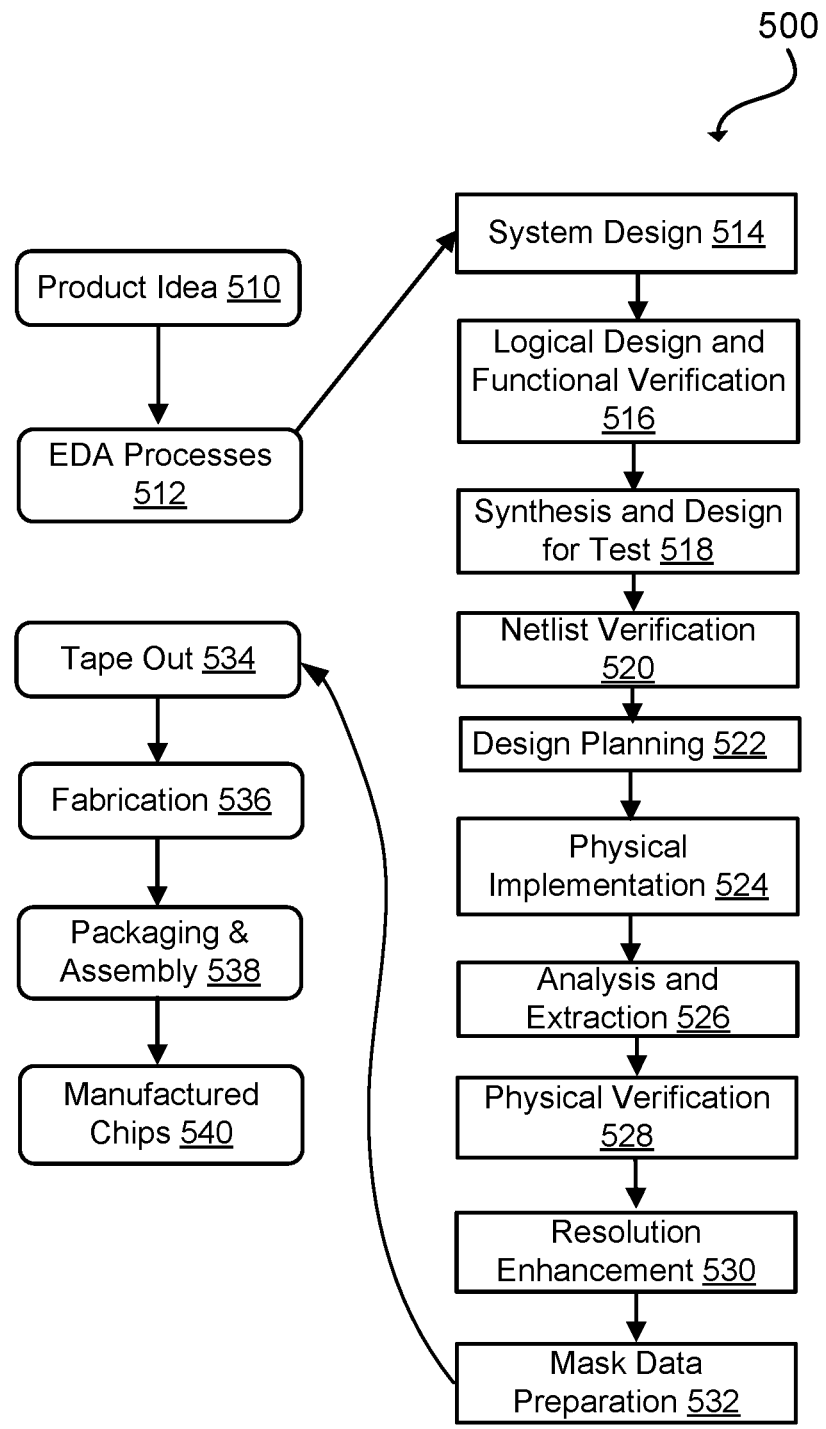
FIG. 5 is a flowchart of various processes used during the design and manufacture of an integrated circuit according to some embodiments of the present disclosure.

FIG. 5 illustrates an example set of processes 500 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 510 with information supplied by a designer, information which is transformed to create an article of manufacture that uses a set of EDA processes 512. When the design is finalized, the design is taped-out 534, which is when artwork (e.g., geometric patterns) for the integrated circuit is sent to a fabrication facility to manufacture the mask set, which is then used to manufacture the integrated circuit. After tape-out, a semiconductor die is fabricated 536 and packaging and assembly processes 538 are performed to produce the finished integrated circuit 540.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding systems of that layer (e.g., a formal verification system). A design process may use a sequence depicted in FIG. 5. The processes described may be enabled by EDA products (or EDA systems).

During system design 514, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 516, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 518, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 520, the netlist is checked for compliance with timing constraints and for correspondence with the HDL code. During design planning 522, an overall floor plan for the integrated circuit is constructed and analyzed for timing and top-level routing.

During layout or physical implementation 524, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 526, the circuit function is verified at the layout level, which permits refinement of the layout design. During physical verification 528, the layout design is checked to ensure that manufacturing constraints are correct, such as DRC constraints, electrical constraints, lithographic constraints, and that circuitry function matches the HDL design specification. During resolution enhancement 530, the geometry of the layout is transformed to improve how the circuit design is manufactured.

During tape-out, data is created to be used (after lithographic enhancements are applied if appropriate) for production of lithography masks. During mask data preparation 532, the 'tape-out' data is used to produce lithography masks that are used to produce finished integrated circuits.

A storage subsystem of a computer system (such as computer system 600 of FIG. 6) may be used to store the programs and data structures that are used by some or all of the EDA products described herein, and products used for development of cells for the library and for physical and logical design that use the library.

Figure 6:
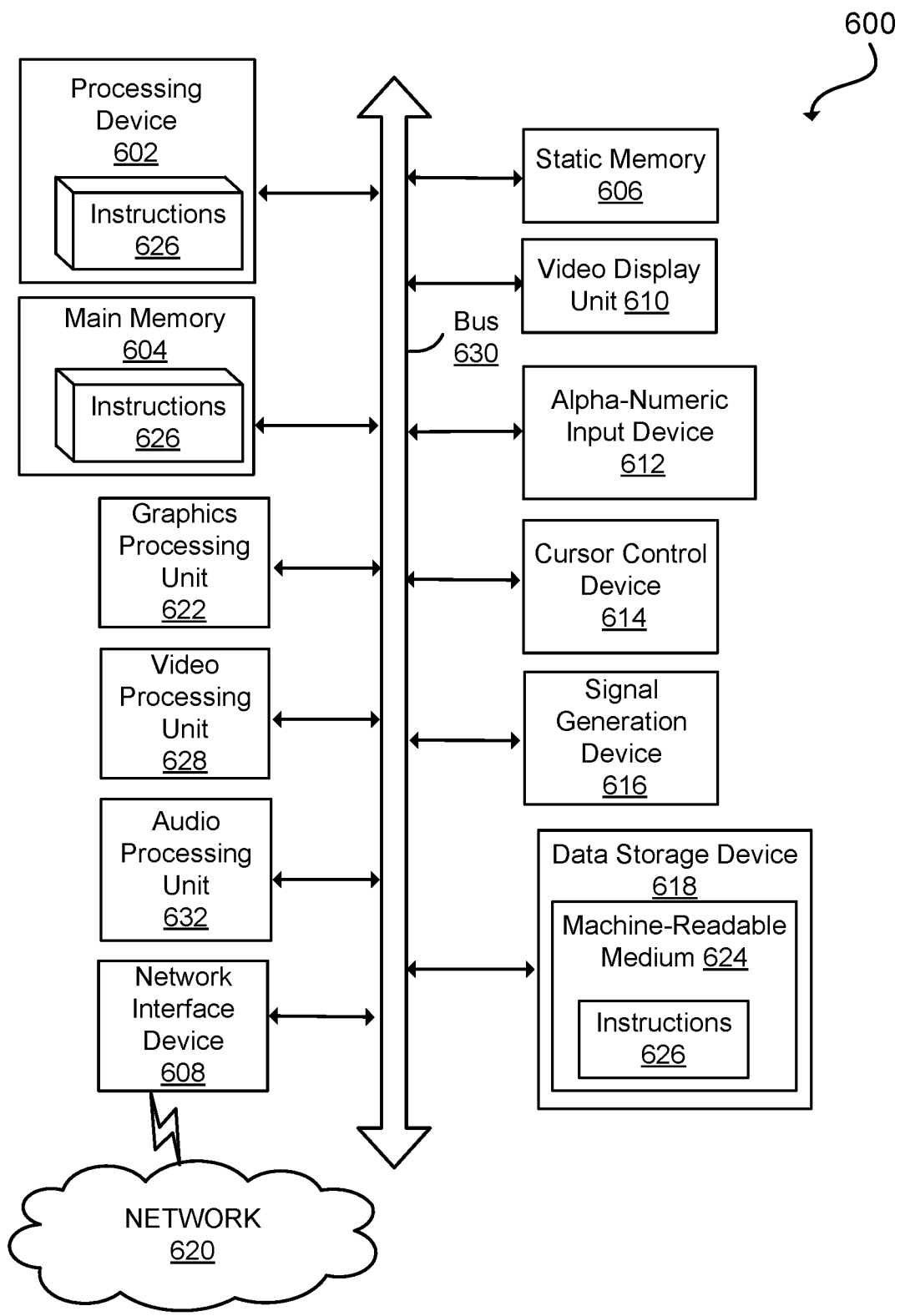
FIG. 6 depicts a diagram of an example computer system in which some embodiments of the present disclosure may operate.

FIG. 6 illustrates an example machine of a computer system 600 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM), a static memory 606 (e.g., flash memory, static random access memory (SRAM), etc.), and a data storage device 618, which communicate with each other via a bus 630.

Processing device 602 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 may be configured to execute instructions 626 for performing the operations and steps described herein.

The computer system 600 may further include a network interface device 608 to communicate over the network 620. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), a graphics processing unit 622, a signal generation device 616 (e.g., a speaker), graphics processing unit 622, video processing unit 628, and audio processing unit 632.

The data storage device 618 may include a machine-readable storage medium 624 (also known as a non-transitory computer-readable medium) on which is stored one or more sets of instructions 626 or software embodying any one or more of the methodologies or functions described herein. The instructions 626 may also reside, completely or at least partially, within the main memory 604 and/or within the processing device 602 during execution thereof by the computer system 600, the main memory 604 and the processing device 602 also constituting machine-readable storage media.

In some implementations, the instructions 626 include instructions to implement functionality corresponding to the present disclosure. While the machine-readable storage medium 624 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 602 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method comprising:
locating, by a processing device, a tail region of a distribution for a response of a transistor-level target netlist as a function of process variation, comprising: performing a variation analysis based on samples generated by circuit simulations of one or more transistor-level surrogate netlists, wherein the circuit simulations of the surrogate netlists have shorter runtimes than circuit simulations of the target netlist; and
characterizing the distribution in the tail region based on samples generated by circuit simulations of the target netlist.

2. The method of claim 1 wherein at least one surrogate netlist is a logic reduced version of the target netlist.

3. The method of claim 1 wherein at least one simulation of the surrogate netlist uses a same simulator as the simulation of the target netlist, but at different simulator settings that have a shorter runtime than simulator settings used for the simulation of the target netlist.

4. The method of claim 1 wherein at least one simulation of the surrogate netlist uses a different simulator than the simulation of the target netlist, wherein the different simulator has a shorter runtime than a simulator used for the simulation of the target netlist.

5. The method of claim 1 wherein the surrogate netlists perform a same logic function as the target netlist.

6. The method of claim 1 wherein the response includes at least one of propagation delay, timing slew, hold and/or setup times, and duty cycle; and the process variation includes at least one of oxide thickness, random dopant fluctuation, and line edge roughness.

7. The method of claim 1 wherein the tail region includes at least a 4σ tail region of the distribution.

8. A system comprising:
a memory storing instructions; and
a processing device, coupled with the memory and to execute the instructions, the instructions when executed cause the processing device to:
execute a search stage to identify a specified region of a distribution for a response of a transistor-level target netlist as a function of process variation, based on samples generated by circuit simulations of one or more transistor-level surrogate netlists; and
execute a characterization stage to characterize the distribution in the specified region based on samples generated by circuit simulations of the target netlist.

9. The system of claim 8 wherein the search stage uses at least one of selective sampling, machine learning, multi-resolution modeling, and statistical analysis.

10. The system of claim 8 wherein the search stage includes multiple iterations, and at least two different surrogate netlists are used to generate samples for different iterations.

11. The system of claim 10 wherein the search stage programmatically selects which surrogate netlists are used to generate samples for different iterations.

12. The system of claim 10 wherein the surrogate netlists used to generate samples are selected from a pool of surrogate netlists, and the search stage programmatically changes the surrogate netlists in the pool for different iterations.

13. The system of claim 8 wherein the characterization stage includes mapping responses of surrogate netlists to responses of the target netlist.

14. The system of claim 8 wherein the instructions when executed further cause the processing device to:
execute an initialization stage that includes receiving, from a user, a specification of the response and of the specified region.

15. The system of claim 8 wherein a number of circuit simulations run during the search stage is greater than a number of circuit simulations run during the characterization stage.

16. The system of claim 8 wherein the target netlist is a transistor-level netlist of a standard cell or a memory block.

17. A non-transitory computer readable medium comprising stored instructions, which when executed by a processing device, cause the processing device to:
generate a plurality of transistor-level candidate surrogate netlists from a transistor-level target netlist;
select a pool of one or more surrogate netlists from the plurality of candidate surrogate netlists; and
perform a variation analysis based on samples generated by circuit simulations of surrogate netlists from the pool, wherein the variation analysis locates a tail region of a distribution for a response of the target netlist as a function of process variation.

18. The non-transitory computer readable medium of claim 17 wherein selecting the pool of surrogate netlists is based on a runtime speedup of the candidate surrogate netlists compared to the target netlist, and a correlation between the responses of the candidate surrogate netlists and the responses of the target netlist.

19. The non-transitory computer readable medium of claim 18 wherein selecting the pool of surrogate netlists comprises selecting the candidate surrogate netlists that form a Pareto front for runtime speedup and correlation of the responses.

20. The non-transitory computer readable medium of claim 17 wherein selecting the pool of surrogate netlists comprises:
generating samples by circuit simulations of the candidate surrogate netlists;
relating the samples for different candidate surrogate netlists; and
selecting the pool based on the samples after relating.

* * * * *